United States Patent
Takahashi et al.

(10) Patent No.: US 9,119,104 B2
(45) Date of Patent: Aug. 25, 2015

(54) MOBILE COMMUNICATION METHOD AND RADIO BASE STATION

(75) Inventors: Hideaki Takahashi, Tokyo (JP); Tetsushi Abe, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/884,525

(22) PCT Filed: Nov. 11, 2011

(86) PCT No.: PCT/JP2011/076033
§ 371 (c)(1),
(2), (4) Date: Jul. 29, 2013

(87) PCT Pub. No.: WO2012/063932
PCT Pub. Date: May 18, 2012

(65) Prior Publication Data
US 2013/0301528 A1    Nov. 14, 2013

(30) Foreign Application Priority Data
Nov. 12, 2010  (JP) .................................. 2010-253712

(51) Int. Cl.
*H04W 24/10* (2009.01)
*H04W 72/04* (2009.01)
*H04W 36/20* (2009.01)
*H04W 72/08* (2009.01)
(Continued)

(52) U.S. Cl.
CPC ............ *H04W 24/10* (2013.01); *H04W 72/082* (2013.01); *H04W 36/20* (2013.01); *H04W 36/30* (2013.01); *H04W 72/0426* (2013.01); *H04W 92/20* (2013.01)

(58) Field of Classification Search
CPC . H04W 80/04; H04W 36/18; H04W 36/0011; H04W 36/14; H04W 36/08; H04W 36/30; H04W 36/24; H04W 36/0083; H04W 36/0088; H04W 36/0094; H04W 36/20; H04W 36/22; H04W 24/00; H04W 24/10; H04W 92/20; H04W 72/082; H04W 72/0426; H04W 36/04; H04W 36/16
See application file for complete search history.

(56) References Cited

U.S. PATENT DOCUMENTS

2010/0267408 A1*  10/2010  Lee et al. ....................... 455/509
2010/0304743 A1*  12/2010  Jung et al. ...................... 455/434
2011/0199986 A1*   8/2011  Fong et al. ..................... 370/329

(Continued)

OTHER PUBLICATIONS

Office Action issued in Korean Patent Application No. 10-2013-7012712, mailed Sep. 5, 2013, with English translation thereof (7 pages).

(Continued)

*Primary Examiner* — Candal Elpenord
(74) *Attorney, Agent, or Firm* — Osha Liang LLP

(57) ABSTRACT

Provided is a mobile communication method including a step A of transmitting, by a mobile station UE, "Measurement Report" including measurement results of radio qualities of neighboring cells #2 to #4 in a downlink to a radio base station eNB#1 that manages a cell #1 in which the mobile station UE is in communication, a step B of selecting, by the radio base station eNB#1, the cell #2 from among the neighboring cells #2 to #4 on the basis of the "Measurement Report", and a step C of transmitting, by the radio base station eNB#1, "DL HI indication" indicating an influence of interference on the mobile station UE in a downlink direction being strong to a radio base station eNB#2 that manages the cell #2.

8 Claims, 8 Drawing Sheets

(51) Int. Cl.
*H04W 36/30* (2009.01)
*H04W 92/20* (2009.01)

(56) References Cited

U.S. PATENT DOCUMENTS

| | | | |
|---|---|---|---|
| 2011/0249542 A1* | 10/2011 | Miyagi et al. | 369/69 |
| 2011/0249642 A1* | 10/2011 | Song et al. | 370/329 |
| 2012/0113843 A1* | 5/2012 | Watfa et al. | 370/252 |
| 2012/0113847 A1* | 5/2012 | Narasimha et al. | 370/252 |
| 2012/0113961 A1* | 5/2012 | Krishnamurthy | 370/332 |
| 2012/0115469 A1* | 5/2012 | Chen et al. | 455/434 |
| 2012/0147826 A1* | 6/2012 | Teck et al. | 370/329 |
| 2012/0149362 A1* | 6/2012 | Tooher et al. | 455/423 |
| 2013/0153298 A1* | 6/2013 | Pietraski et al. | 175/45 |

OTHER PUBLICATIONS

3GPP TSG WG3 Meeting #70; R3-103191; "Self-Organized Mechanism for TD-based eICIC;" New Postcom; Jacksonville, Florida; Nov. 15-19, 2010 (3 pages).
International Search Report issued in PCT/JP2011/076033 mailed Dec. 6, 2011 (3 pages).
CMCC(Rapporteur), "Summary of the description of candidate eICIC solutions", 3GPP TSG-WG1 #62; R1-105081; Madrid, Spain; Aug. 23-27, 2010 (6 pages).
RAN1, "LS on time-domain extension of Rel 8/9 backhaul-based ICIC for Macro-Pico scenario", 3GPP TSG-RAN WG1 #62bis; R1-105793; Xi'an, China; Oct. 11-15, 2010 (2 pages).
Motorola, "Discussion of time domain eICIC scheme for Rel-10", 3GPP TSG RAN WG1 Meeting #62bis; R1-105622; Xi'an, China; Oct. 11-15, 2010 (6 pages).
3GPP TR 36.423 V9.4.0; "3rd Generation Partnership Project; Technical Specification Group Radio Access Network; Evolved Universal Terrestrial Radio Access Network (E-UTRAN); X2 application protocol (X2AP) (Release 9)"; Sep. 2010 (121 pages).
Japanese Office Action for Application No. 2010-253712, mailed on Dec. 6, 2011 (6 pages).
RAN1, "Way Forward on time-domain extension of Rel 8/9 backhaul-based ICIC", TSG-RAN WG1 Meeting #62bis; R1-105779; Xi'an, P.R. China; Oct. 11-15, 2010 (4 pages).
3GPP TS 36.300 V10.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Sep. 2010 (192 pages).
3GPP TS 36.211 V9.1.0; "3rd Generation Partnership Project; Technical Specification Group Radio Access Network; Evolved Universal Terrestrial Radio Access (E-UTRA); Physical Channels and Modulation (Release 9)"; Mar. 2010 (85 pages).
Extended European Search Report in counterpart European Patent Application No. 11839982.3, mailed Apr. 25, 2014 (8 pages).
Nokia Siemens Networks; "On X2 signaling for TDM eICIC in Macro+Pico scenarios"; 3GPP TSG RAN WG3 # 70 Meeting, R3-103555; Jacksonville, United States; Nov. 15-19, 2010 (4 pages).
Qualcomm Incorporated; "Overview of eICIC backhaul procedure"; 3GPP TSG-RAN WG3 #70, R3-103414; Jacksonville, USA; Nov. 15-19, 2010 (3 pages).
CMCC(Rapporteur); "Summary of the description of candidate eICIC solutions"; 3GPP TSG-WG1 #62, R1-105081; Madrid, Spain; Aug. 23-27, 2010 (6 pages).
Office Action in counterpart Korean Patent Application No. 10-2013-7012712, mailed May 1, 2014 (5 pages).
Office Action in counterpart Korean Patent Application No. 10-2013-7012712 dated Jan. 15, 2014 (5 pages).

* cited by examiner

FIG. 3
X2 Load Information

| IE/Group Name | Presence | Range | IE type and reference | Semantics description | Criticality | Assigned Criticality |
|---|---|---|---|---|---|---|
| Message Type | M | | | | YES | ignore |
| Cell Information | M | | | | YES | ignore |
| >Cell Information Item | | 1 to maxCellineNB | | | EACH | ignore |
| >>Cell ID | M | | ECGI | Id of the source cell | — | — |
| >>UL Interference Overload Indication | O | | | | — | — |
| >>UL High Interference Information | | 0 to maxCellineNB | | | — | — |
| >>>Target Cell ID | M | | ECGI | Id of the cell for which the HII is meant | — | — |
| >>>UL High Interference Indication | M | | | | — | — |
| >>Relative Power (RNTP) | O | | | | — | — |
| >> DL High Interference Indication | O | | | | | |

FIG. 4
eNB Configuration Update

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Add | | 0 to maxCellineNB | | This IE shall contain the complete list of added cells served by the eNB | GLOBAL | reject |
| >Served Cell Information | M | | | | | – |
| >Neighbour Information | M | 0 to maxnoofNeighbours | | | | – |
| >>ECGI | M | | ECGI 9.2.14 | E-UTRAN Cell Global Identifier of the neighbour cell | – | – |
| >>PCI | M | | INTEGER (0..503,...) | Physical Cell identifier of the neighbour cell | – | – |
| >>EARFCN | M | | 9.2.26 | DL EARFCN for FDD and EARFCN for TDD | – | – |
| Served Cells To Modify | | 0 to maxCellineNB | | This IE shall contain the complete list of modified cells served by the eNB | GLOBAL | reject |
| >Old ECGI | M | | ECGI 9.2.14 | This is the old EUTRAN Cell Global Identifier | – | – |
| >Served Cell Information | M | | 9.2.8 | | – | – |
| >Neighbour Information | M | 0 to maxnoofNeighbours | | | – | – |
| >>ECGI | M | | ECGI 9.2.14 | E-UTRAN Cell Global Identifier of the neighbour cell | – | – |
| >>PCI | M | | INTEGER (0..503,...) | Physical Cell Identifier of the neighbour cell | – | – |
| >>EARFCN | M | | 9.2.26 | DL EARFCN for FDD and EARFCN for TDD | – | – |
| >Deactivation Indication | O | | ENUMERATED(deactivated, ...) | Indicates the concerned cell is switched off for energy saving reasons | YES | ignore |
| Served Cells To Delete | | 0 to maxCellineNB | | This IE shall contain the complete list of deleted cells served by the eNB | GLOBAL | reject |
| >Old ECGI | M | | ECGI 9.2.14 | This is the old EUTRAN Cell Global Identifier of the cell to be deleted | – | – |
| GU Group Id To Add List | | 0 to maxPools | | | GLOBAL | reject |
| >GU Group Id | M | | 9.2.20 | | – | – |
| GU Group Id To Delete List | | 0 to maxPools | | | GLOBAL | reject |
| >GU Group Id | M | | 9.2.20 | | – | – |

FIG. 5  Served Cell Information IE

| IE/Group Name | Presence | Range | IE type and reference | Semantics description | Criticality | Assigned Criticality |
|---|---|---|---|---|---|---|
| PCI | M | | INTEGER (0..503,....) | Physical Cell ID | – | – |
| Cell ID | M | | ECGI 9.2.14 | | – | – |
| TAC | M | | OCTET STRING(2) | Tracking Area Code | – | – |
| Broadcast PLMNs | | 1..<maxnoofBPLMNs> | | Broadcast PLMNs | – | – |
| >PLMN Identity | M | | 9.2.4 | | – | – |
| CHOICE EUTRA-Mode-Info | M | | | | – | – |
| >DL High Interference Indication | O | | | | | |
| >FDD | | 1 | | | | |
| >>FDD Info | | | | | – | – |
| >>>UL EARFCN | M | | EARFCN 9.2.26 | Corresponds to $N_{UL}$ in ref. [16] | – | – |
| >>>DL EARFCN | M | | EARFCN 9.2.26 | Corresponds to $N_{DL}$ in ref. [16] | – | – |
| >>>UL Transmission Bandwidth | M | | Transmission Bandwidth 9.2.27 | | – | – |
| >>>DL Transmission Bandwidth | M | | Transmission Bandwidth 9.2.27 | Same as UL Transmission Bandwidth in this release. | – | – |
| >TDD | | 1 | | | – | – |
| >>TDD Info | | | | | – | – |
| >>>EARFCN | M | | 9.2.26 | Corresponds to $N_{DL}/N_{UL}$ in ref. [16] | – | – |
| >>>Transmission Bandwidth | M | | Transmission Bandwidth 9.2.27 | | – | – |
| >>>Subframe Assignment | M | | ENUMERATED(sa0, sa1, sa2, sa3, sa4, sa5, sa6,...) | Uplink-downlink subframe configurationinformation defined in ref. [10]. | – | – |
| >>>Special Subframe Info | | 1 | | Special subframe configurationinformation defined in ref. [10]. | – | – |
| >>>>Special Subframe Patterns | M | | ENUMERATED(ssp0, ssp1, ssp2, ssp3, ssp4, ssp5, ssp6, ssp7, ssp8,....) | | – | – |
| >>>>Cyclic Prefix DL | M | | ENUMERATED(, Extended...) | | – | – |
| >>>>Cyclic Prefix UL | M | | ENUMERATED(, Extended...) | | – | – |
| Number of Antenna Ports | O | | 9.2.43 | | YES | ignore |
| PRACH Configuration | O | | PRACH Configuration 9.2.50 | | YES | ignore |
| MBSFN Subframe Info | | 0 to maxnoofMBSFN | | MBSFN subframe configuration information defined in ref. [9] | GLOBAL | ignore |
| >Radioframe Allocation Period | M | | ENUMERATED(n1, n2, n4, n8, n16, n32, ...) | | – | – |
| >Radioframe Allocation Offset | M | | INTEGER (0...7, ...) | | – | – |
| >Subframe Allocation | M | | 9.2.51 | | – | – |

FIG. 6
X2 Setup Request

| IE/Group Name | Presence | Range | IE type and reference | Semantics description | Criticality | Assigned Criticality |
|---|---|---|---|---|---|---|
| Message Type | M | | 9.2.13 | | YES | reject |
| GlobaleNB ID | M | | 9.2.22 | | YES | reject |
| Served Cells | | 1 to maxCellineNB | | This IE shall contain the complete list of cells served by the eNB | YES | reject |
| >Served Cell Information | M | | 9.2.8 | | — | — |
| >Neighbour Information | | 0 to maxnoofNeighbours | | | — | — |
| >>ECGI | M | | ECGI 9.2.14 | E-UTRAN Cell Global Identifier of the neighbour cell | — | — |
| >>PCI | M | | INTEGER (0..503, ...) | Physical Cell Identifier of the neighbour cell | — | — |
| >>EARFCN | M | | 9.2.26 | DL EARFCN for FDD and EARFCN for TDD | — | — |
| GU Group Id List | | 0 to maxIPools | | This is all the pools to which the eNB belongs to | GLOBAL | reject |
| >GU Group Id | M | | 9.2.20 | | — | — |

FIG. 7
X2 Setup Response

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 to maxCellineNB | | This IE shall contain the complete list of cells served by the eNB | YES | reject |
| >Served Cell Information | M | | | | – | – |
| >Neighbour Information | | 0 to maxnoofNeighbours | | | – | – |
| >>ECGI | M | | ECGI 9.2.14 | E-UTRAN Cell Global Identifier of the neighbour cell | – | – |
| >>PCI | M | | INTEGER (0..503, ...) | Physical Cell Identifirr of the neighbour cell | – | – |
| >>EARFCN | M | | 9.2.26 | DL EARFCN for FDD and EARFCN for TDD | – | – |
| GU Group Id List | | 0 to maxPools | | This is all the pools to which the eNB belongs to | GLOBAL | reject |
| >GU Group Id | M | | 9.2.20 | | – | – |
| Criticality Diagnostics | O | | 9.2.7 | | YES | ignore |

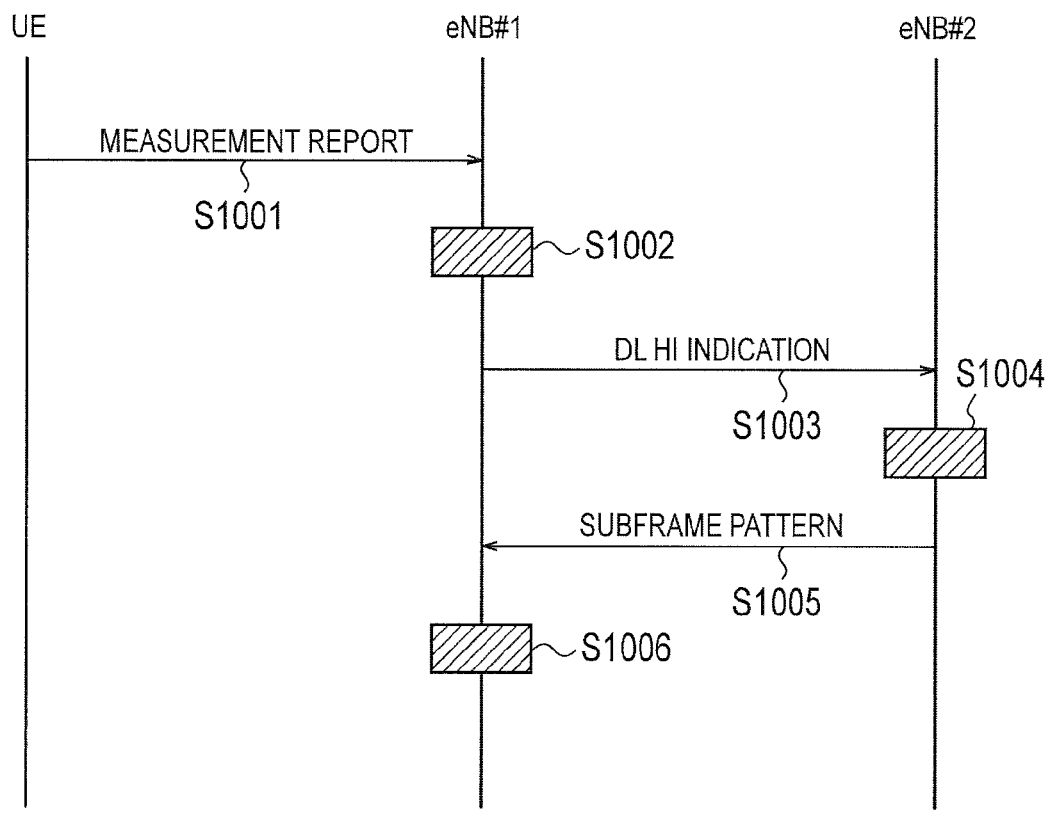

MOBILE COMMUNICATION METHOD AND RADIO BASE STATION

TECHNICAL FIELD

The present invention relates to a mobile communication method and a radio base station.

BACKGROUND ART

In an LTE (Long Term Evolution) scheme, in order to reduce inter-cell interference, it is discussed to use "eICIC (Enhanced Inter Cell Interference Coordination)".

CITATION LIST

Non Patent Literature

[NPL 1] 3GPP contribution R1-105779
[NPL 2] 3GPP TS36.423
[NPL 3] 3GPP TS36.300
[NPL 4] 3GPP TS36.211

SUMMARY OF INVENTION

Technical Problem

Unfortunately, in a conventional LTE scheme, since a timing at which the "eICIC" is started is not defined, there is a problem in that the "eICIC" is not started at an appropriate timing.

Therefore, the present invention has been achieved in view of the above-described problem, and an object of the present invention is to provide a mobile communication method and a radio base station with which it is possible to start "eICIC" at an appropriate timing.

Solution to Problem

A first characteristic of the present invention is summarized in including: a step A of transmitting, by a mobile station, a measurement report including measurement results of radio qualities of neighboring cells in a downlink to a first radio base station that manages a first cell in which the mobile station is in communication; a step B of selecting, by the first radio base station, a second cell from among the neighboring cells on the basis of the measurement report; and a step C of transmitting, by the first radio base station, interference indication information indicating an influence of interference on the mobile station in a downlink direction being strong to a second radio base station that manages the second cell.

A second characteristic of the present invention is summarized as a radio base station that manages a cell in which a mobile station is in communication, including: a measurement report receiving unit that receives a measurement report including measurement results of radio qualities of neighboring cells in a downlink from the mobile station; a selection unit that selects a specific cell from among the neighboring cells on the basis of the measurement report; and an interference indication information transmission unit that transmits interference indication information indicating an influence of interference on the mobile station in a downlink direction being strong to a specific radio base station that manages the specific cell.

Advantageous Effects of Invention

As described above, according to the present invention, it is possible to provide a mobile communication method and a radio base station with which it is possible to start "eICIC" at an appropriate timing.

BRIEF DESCRIPTION OF DRAWINGS

FIG. 3 is a diagram illustrating an example of a format of "X2 Load Information" used in the mobile communication system according to the first embodiment of the present invention.

FIG. 4 is a diagram illustrating an example of a format of "eNB Configuration Update" used in the mobile communication system according to the first embodiment of the present invention.

FIG. 5 is a diagram illustrating an example of a format of "Served Cell Information" as an information element included in the "eNB Configuration Update", etc., used in the mobile communication system according to the first embodiment of the present invention.

FIG. 6 is a diagram illustrating an example of a format of "X2 Setup Request" used in the mobile communication system according to the first embodiment of the present invention.

FIG. 7 is a diagram illustrating an example of a format of "X2 Setup Response" used in the mobile communication system according to the first embodiment of the present invention.

FIG. 8 is a sequence diagram illustrating an operation of the mobile communication system according to the first embodiment of the present invention.

DESCRIPTION OF EMBODIMENTS

Mobile Communication System According to First Embodiment of the Present Invention A mobile communication system according to a first embodiment of the present invention is described with reference to FIG. 1 through FIG. 8. In the present embodiment, an LTE mobile communication system will be described as an example of the mobile communication system according to the present embodiment. However, the present invention is also applicable to mobile communication systems other than the LTE mobile communication system.

The mobile communication system according to the present embodiment is configured to perform "eICIC" using a "Time domain scheme".

Figure 1:
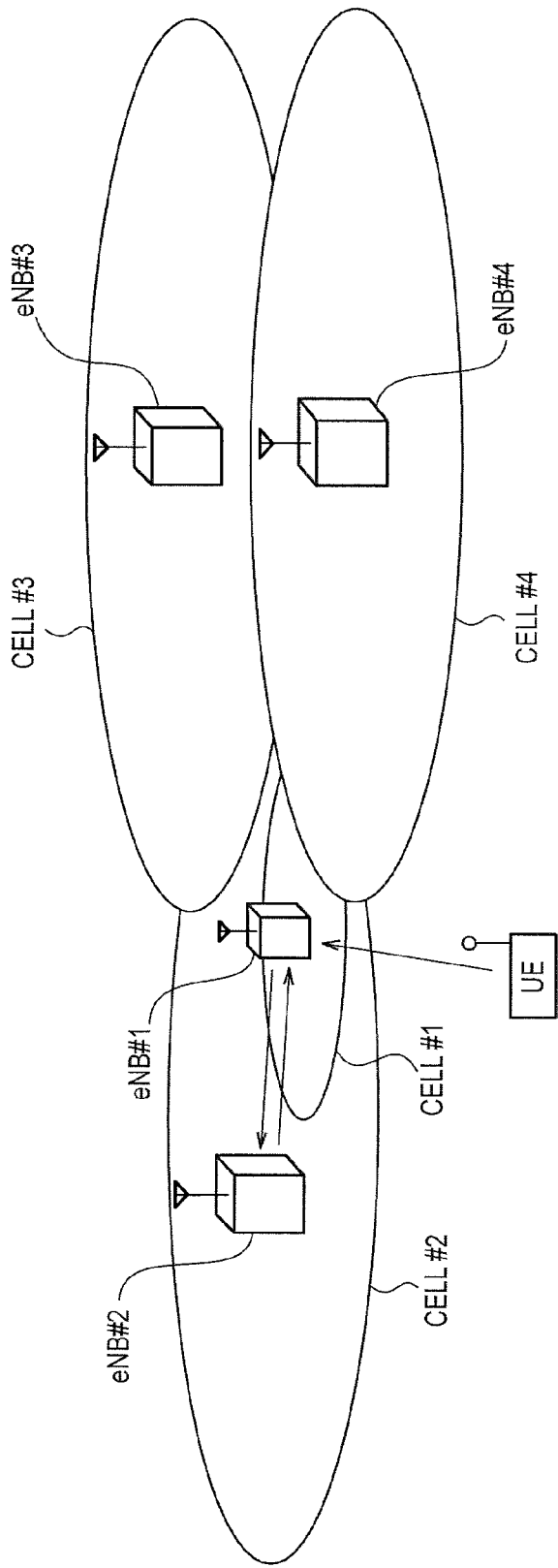
FIG. 1 is a diagram showing the entire configuration of a mobile communication system according to a first embodiment of the present invention.

As illustrated in FIG. 1, the mobile communication system according to the present embodiment includes a radio base station eNB#1 configured to manage a cell #1, a radio base station eNB#2 configured to manage a cell #2, a radio base station eNB#3 configured to manage a cell #3, and a radio base station eNB#4 configured to manage a cell #4.

Here, the cells #1 to #4 may be micro cells, or may be CSG (Closed Subscriber Group) cells. In addition, the CSG cell may be called a Femto cell, a Micro cell, a Pico cell, or the like.

In the mobile communication system according to the present embodiment, a mobile station UE is assumed to be in a connected state in the cell #1, that is, to be in communication in the cell #1.

Figure 2:
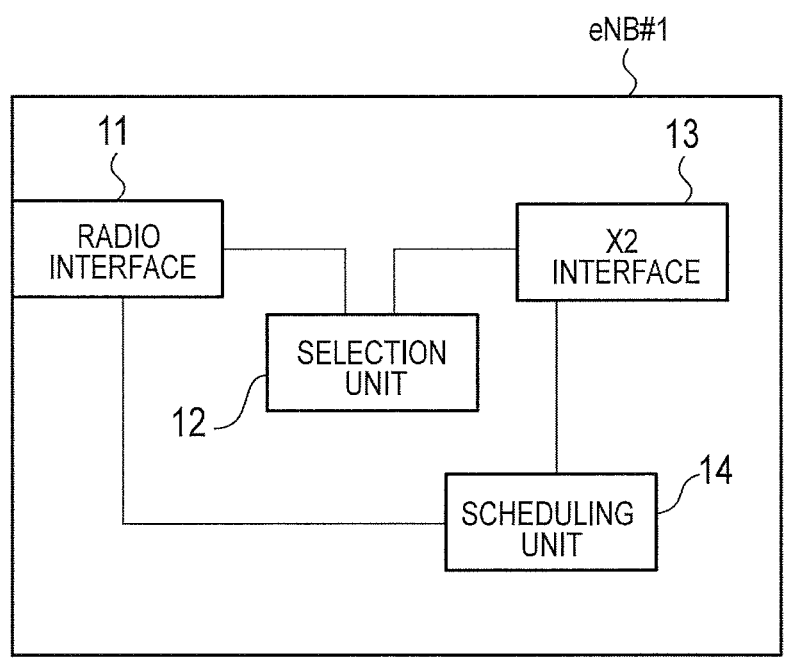
FIG. 2 is a functional block diagram of a radio base station according to the first embodiment of the present invention.

As illustrated in FIG. 2, the radio base station eNB#1 includes a radio interface 11, a selection unit 12, an X2 interface 13, and a scheduling unit 14.

The radio interface 11 is configured to perform radio communication with the mobile station UE through an RRC (Radio Resource Control) connection.

For example, the radio interface 11 is configured to receive "Measurement Report" including measurement results of radio qualities of neighboring cells #2 to #4 in a downlink from the mobile station UE.

The selection unit 12 is configured to select a specific cell (for example, the cell #2) from among the neighboring cells #2 to #4 on the basis of the "Measurement Report", that is, on the basis of the measurement results included in the "Measurement Report".

For example, the selection unit 12 may be configured to select a cell of which the radio quality in the downlink is the worst or a cell of which the radio quality in the downlink is worse than a predetermined radio quality from among the neighboring cells #2 to #4, as the specific cell.

The X2 interface 13 is configured to serve as an interface with the neighboring cells #2 to #4.

Here, the X2 interface 13 is configured to transmit "DL HI (High Interference) Indication" to a specific radio base station eNB (for example, the radio base station eNb#2) that manages the specific cell.

Here, the "DL HI Indication" is information indicating an influence of interference on the mobile station UE in a downlink direction being strong.

For example, the X2 interface 13 may be configured to transmit the "DL HI Indication" by using "X2 Load Information".

Specifically, as illustrated in FIG. 3, the X2 interface 13 may be configured to transmit "DL HI Indication" within "Cell Information" as an information element within the "X2 Load Information".

Alternatively, the X2 interface 13 may be configured to transmit the "DL HI Indication" by using "eNB Configuration Update".

Specifically, as illustrated in FIGS. 4 and 5, the X2 interface 13 may be configured to transmit "DL HI Indication" within "Served Cell Information" as an information element within the "eNB Configuration Update".

Otherwise, the X2 interface 13 may be configured to transmit the "DL HI Indication" by using "X2 Setup Request".

Specifically, as illustrated in FIGS. 5 and 6, the X2 interface 13 may be configured to transmit "DL HI Indication" within "Served Cell Information" as an information element within the "X2 Setup Request".

Alternatively, the X2 interface 13 may be configured to transmit the "DL HI Indication" by using "X2 Setup Response".

Specifically, as illustrated in FIGS. 5 and 7, the X2 interface 13 may be configured to transmit "DL HI Indication" within "Served Cell Information" as an information element within the "X2 Setup Response".

The scheduling unit 14 is configured to perform scheduling on the mobile station UE in the downlink on the basis of a subframe pattern received by the X2 interface 13 from the radio base station eNb#2.

Here, the subframe pattern indicates a subframe that does not transmit downlink data, for example, an ABS (Almost Blank Subframe) or an MBSFN (Multicast Broadcast Single Frequency Network) subframe.

For example, the scheduling unit 14 may be configured to perform scheduling on the mobile station UE in the downlink in the ABS or the MBSFN subframe designated by the subframe pattern.

Hereinafter, an operation of the mobile communication system according to the present embodiment will be described with reference to FIG. 8.

As illustrated in FIG. 8, in step S1001, the mobile station UE transmits the "Measurement Report" including the measurement results of the radio qualities of the neighboring cells #2 to #4 in the downlink to the radio base station eNB#1 that manages the cell #1 in which the mobile station UE is in communication.

In step S1002, the radio base station eNB#1 selects the cell #2 as the specific cell from among the neighboring cells #2 to #4 on the basis of the measurement results included in the "Measurement Report".

In step S1003, the radio base station eNB#1 transmits the "DL HI Indication" to the radio base station eNB#2 that manages the cell #2.

In step S1004, the radio base station eNB#2 starts the "eICIC" using the "Time domain scheme" in response to the "DL HI Indication", and sets the ABS or the MBSFN subframe, that is a subframe which does not transmit the downlink data.

Even when the "DL HI Indication" is received, the radio base station eNB#2 may not set the ABS or the MBSFN subframe, that is a subframe which does transmit the downlink data.

In step S1005, the radio base station eNB#2 transmits the subframe pattern indicating the subframe which does not transmit the set downlink data to the radio base station eNB#1.

In step S1006, the radio base station eNB#1 performs scheduling on the mobile station UE in the downlink on the basis of the subframe pattern.

In the mobile communication system according to the present embodiment, when the "DL HI Indication" indicating the influence of the interference on the mobile station UE in the downlink being strong is received from the radio base station eNB#1, since the radio base station eNB#2 is configured to start the "eICIC" using the "Time domain scheme", it is possible to appropriately start the "eICIC".

The characteristics of the present embodiment as described above may be expressed as follows.

A first characteristic of the present embodiment is summarized in that the mobile communication method including: a step A of transmitting, by a mobile station UE, "Measurement Report" including the measurement results of the radio qualities of neighboring cells #2 to #4 in a downlink to a radio base station eNB#1 (a first radio base station) that manages a cell #1 (a first cell) in which the mobile station UE is in communication; a step B of selecting, by the radio base station eNB#1, the cell #2 (a second cell) from among the neighboring cells #2 to #4 on the basis of the "Measurement Report"; and a step C of transmitting, by the radio base station eNB#1, "DL HI indication (interference indication information)" indicating the influence of the interference on the mobile station UE in a downlink direction being strong to a radio base station eNB#2 (a second radio base station) that manages the cell #2.

In the first characteristic of the present embodiment, the mobile communication method may further include a step of transmitting, by the radio base station eNB#2, a subframe pattern (subframe information) indicating the subframe (ABS/MBSFN subframe) that does not transmit downlink data in response to the "DL HI Indication" to the radio base station eNB#1.

In the first characteristic of the present embodiment, in the step C, the radio base station eNB#1 may transmit the "DL HI Indication" by using "X2 Load Information".

In the first characteristic of the present embodiment, in the step C, the radio base station eNB#1 may transmit the "DL HI Indication" by using "eNB Configuration Update (updating information of a configuration of the radio base station).

In the first characteristic of the present embodiment, in the step C, the radio base station eNB#1 may transmit the "DL HI Indication" by using "X2 Setup Request/X2 Setup Response" as information on setting of an X2 connection between the radio base station eNB#1 and the radio base station eNB#2.

A second characteristic of the present embodiment is summarized in that a radio base station eNB managing a cell #1 in which a mobile station UE is in communication includes: a radio interface 11 (a measurement report reception unit) that receives "Measurement Report" including the measurement results of the radio qualities of neighboring cells #2 to #4 in a downlink from the mobile station UE; a selection unit 12 that selects the cell #2 (the specific cell) from among the neighboring cells #2 to #4 on the basis of the "Measurement Report"; and an X2 interface 13 (interference indication information transmission unit) that transmits "DL HI Indication" to a radio base station eNB#2 (the specific radio base station) that manages the cell #2.

In the second characteristic of the present embodiment, the radio base station eNB may further include a scheduling unit 14 that performs scheduling on the mobile station UE in the downlink on the basis of the subframe pattern when the subframe pattern indicating the subframe (ABS/MBSFN subframe) that does not transmit downlink data is received from the radio base station eNB#2.

In the second characteristic of the present embodiment, the X2 interface 13 may be configured to transmit the "DL HI Indication" by using "X2 Load Information".

In the second characteristic of the present embodiment, the X2 interface 13 may be configured to transmit the "DL HI Indication" by using "eNB Configuration Update".

In the second characteristic of the present embodiment, the X2 interface 13 may be configured to transmit the "DL HI Indication" by using "X2 Setup Request/X2 Setup Response".

It should be noted that the operation of the radio base station eNB, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the radio base station eNB, or the mobile station UE. Furthermore, such a storage medium and processor may be arranged in the radio base station eNB, or the mobile station UE as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST eNB . . . Radio base station
11 . . . Radio interface
12 . . . Selection unit
13 . . . X2 interface
14 . . . Scheduling unit
UE . . . Mobile station

The invention claimed is:

1. A mobile communication method, further comprising:
a step A of transmitting, by a mobile station, a measurement report including measurement results of radio qualities of neighboring cells in a downlink to a first radio base station that manages a first cell in which the mobile station is in communication;
a step B of selecting, by the first radio base station, a second cell from among the neighboring cells on the basis of the measurement report;
a step C of transmitting to a second radio base station that manages the second cell, by the first radio base station, interference indication information indicating influence of the interference being strong; and
a step D of the second radio base station starting the eICIC (enhanced inter cell interference coordination) in response to the interference indication information and transmitting subframe information indicating an ABS (Almost Blank Subframe) to the first radio base station.

2. The mobile communication method according to claim 1, wherein in the step C, the first radio base station transmits the interference indication information by using load information.

3. The mobile communication method according to claim 1, wherein in the step C, the first radio base station transmits the interference indication information by using updating information of a configuration of the first radio base station.

4. The mobile communication method according to claim 1, wherein in the step C, the first radio base station transmits the interference indication information by using information on setting of a connection between the first radio base station and the second radio base station.

5. A radio base station that manages a cell in which a mobile station is in communication, further comprising:
a measurement report reception unit that receives a measurement report including measurement results of radio qualities of neighboring cells in a downlink from the mobile station;
a selection unit that selects a specific cell from among the neighboring cells on the basis of the measurement report;
an interference indication information transmission unit that transmits interference indication information indicating influence of the interference being strong, to a specific radio base station that manages the specific cell; and a scheduling unit that performs scheduling on the mobile station in a downlink on the basis of subframe information indicating an ABS (Almost Blank Subframe) when the subframe information is received from the specific radio base station starting an eICIC (enhanced inter cell interference coordination) in response to the interference indication information.

6. The radio base station according to claim 5, wherein the interference indication information transmission unit is configured to transmit the interference indication information by using load information.

7. The radio base station according to claim 5, wherein the interference indication information transmission unit is configured to transmit the interference indication information by using updating information of a configuration of the radio base station.

8. The radio base station according to claim 5, wherein the interference indication information transmission unit is configured to transmit the interference indication information by using information on setting of a connection between the radio base station and the specific radio base station.

* * * * *